United States Patent
Young et al.

(10) Patent No.: US 10,706,348 B2
(45) Date of Patent: *Jul. 7, 2020

(54) SUPERPIXEL METHODS FOR CONVOLUTIONAL NEURAL NETWORKS

(71) Applicant: Google LLC, Mountain View, CA (US)

(72) Inventors: Reginald Clifford Young, Palo Alto, CA (US); Jonathan Ross, Mountain View, CA (US)

(73) Assignee: Google LLC, Mountain View, CA (US)

( * ) Notice: Subject to any disclaimer, the term of this patent is extended or adjusted under 35 U.S.C. 154(b) by 929 days.

This patent is subject to a terminal disclaimer.

(21) Appl. No.: 15/209,658

(22) Filed: Jul. 13, 2016

(65) Prior Publication Data
US 2018/0018554 A1    Jan. 18, 2018

(51) Int. Cl.
*G06N 3/04*    (2006.01)
*G06N 3/02*    (2006.01)
(Continued)

(52) U.S. Cl.
CPC .............. *G06N 3/04* (2013.01); *G06F 17/16* (2013.01); *G06N 3/02* (2013.01); *G06N 3/063* (2013.01)

(58) Field of Classification Search
CPC ......... G06T 2207/20084; G06T 3/4046; G06T 3/4053; G06T 7/50; G06K 9/52; G06K 9/6267; G06K 2209/01; G06K 9/46; G06K 9/00523; G06K 9/4671; G06F 17/16; G06F 17/18; G06N 3/02; G06N 3/04; G06N 3/063; G06N 3/0454; G06N 3/08

See application file for complete search history.

(56) References Cited

U.S. PATENT DOCUMENTS 9,940,573 B2 *  4/2018  Young ..................... G06N 3/04
10,223,788 B2 *  3/2019  Bozorgtabar ......... G06T 7/0012
(Continued)

FOREIGN PATENT DOCUMENTS

CN          104915322       9/2015
WO      WO 2014/105865      7/2014

OTHER PUBLICATIONS

Liu et al., "Learning Depth from Single Monocular Images Using Deep Convolutional Neural Fields", IEEE Transactions on Pattern Analysis and Machine Learning Intelligence, pp. 1-14 (Year: 2015).*
(Continued)

*Primary Examiner* — Paulinho E Smith
(74) *Attorney, Agent, or Firm* — Fish & Richardson P.C.

(57) ABSTRACT

Methods, systems, and apparatus for efficiently performing a computation of a convolutional neural network layer. One of the methods includes transforming a X by Y by Z input tensor into a X' by Y' by Z' input tensor, wherein X' is smaller than or equal to X, Y' is smaller than or equal to Y, and Z' is larger than or equal to Z; obtaining one or more modified weight matrices, wherein the modified weight matrices operate on the X' by Y' by Z' input tensor to generate a U' by V' by W' output tensor, and the U' by V' by W' output tensor comprises a transformed U by V by W output tensor; and processing the X' by Y' by Z' input tensor using the modified weight matrices to generate the U' by V' by W' output tensor.

23 Claims, 6 Drawing Sheets

(51) Int. Cl.
    *G06N 3/063*    (2006.01)
    *G06F 17/16*    (2006.01)

(56) References Cited

U.S. PATENT DOCUMENTS

| | | | |
|---|---|---|---|
| 2014/0067735 | A1 | 3/2014 | Yu |
| 2014/0180989 | A1 | 6/2014 | Krizhevsky |
| 2015/0065803 | A1* | 3/2015 | Douglas ............ A61B 1/00009 600/200 |
| 2015/0265251 | A1* | 9/2015 | Cho ................. A61B 8/483 600/437 |
| 2016/0035078 | A1 | 2/2016 | Lin |
| 2016/0171707 | A1* | 6/2016 | Schwartz .......... G06K 9/00201 382/180 |
| 2017/0132496 | A1 | 5/2017 | Shoaib |
| 2018/0018554 | A1* | 1/2018 | Young .................. G06N 3/04 |
| 2018/0018556 | A1* | 1/2018 | Young .................. G06N 3/04 |
| 2018/0285683 | A1* | 10/2018 | Chen ................... G06K 9/4671 |
| 2019/0012768 | A1* | 1/2019 | Tafazoli Bilandi ....... G06T 7/50 |
| 2019/0057532 | A1* | 2/2019 | Marzban ............... G06T 11/60 |

OTHER PUBLICATIONS

O'Shea et al., "An Introduction to Convolutional Neural Networks", Dec. 2015, pp. 1-11 (Year: 2015).*

He et al., "SuperCNN: A Superpixelwise Convolutional Neural Network for Salient Object Detections", Springer, Apr. 8, 2015, pp. 1-15 (Year: 2015).*

Collobert et al., "Implementing Neural Networks Eciently," The handbook of brain theory and neural networks 3361.10 (1995), 20 pages.

Cong et al., "Minimizing Computation in Convolutional Neural Networks" ICANN 2014, LNCS 8681, pp. 281-290, 2014.

Gribov, "Efficient Kernel Convolution for Smooth Surfaces without Edge Effects," arXiv:1601.04065 [stat.CO], Jan. 13, 2016, 16 pages.

Karpathy et al., "Large-scale Video Classification with Convolutional Neural Networks," Proceedings of the International Computer Vision and Pattern Recognition (CVPR 2014).

Lavin et al., "Fast Algorithms for Convolutional Neural Networks," arXiv:1509.09308 [cs.NE], Nov. 10, 2015, pp. 1-9.

Lavin, "maxDNN: An Efficient Convolution Kernel for Deep Learning with Maxwell GPUs," arXiv:1501.06633 [cs.NE], Jan. 30, 2015, pp. 1-7.

Ovtcharov et al., "Accelerating Deep Convolutional Neural Networks Using Specialized Hardware," Microsoft Research, Feb. 22, 2015, pp. 1-4.

Tschopp, "Efficient Convolutional Neural Networks for Pixelwise Classification on Heterogeneous Hardware Systems," arXiv:1509.03371v1 [cs.CV], Sep. 11, 2015, 92 pages.

International Search Report and Written Opinion issued in International Application No. PCT/US2017/041930, dated Oct. 25, 2017, 15 pages.

Liu et al. "Sparse Convolutional Neural Networks," 2015 IEEE Conference on Computer Vision and Pattern Recognition, Jun. 7, 2015, 9 pages.

Novikov et al. "Tensorizing Neural Networks," arXiv 1509.06569, Sep. 22, 2015, 9 pages.

Shengfeng et al. "SuperCNN: A Superpixelwise Convolutional Neural Network for Salient Object Detection," International Journal of Computer Vision, Kluwer Academic Publishers, vol. 115(3), Apr. 8, 2015, 15 pages.

AU Office Action in Australian Application No. 2017295714, dated Sep. 27, 2019, 5 pages.

Britz et al, "Understanding Convolutional Neural Networks for NLP" WildML, Nov. 2015, 17 pages.

CA Office Action in Canadian Application No. 3,030,428, dated Dec. 6, 2019, 7 pages.

CN Office Action in Chinese Application No. 201710570292, dated Jan. 13, 2020, 16 pages (with English translation).

Cohen et al, "Convolutional Rectifier Networks as Generalized Tensor Decompositions" arXiv, May 2016, 22 pages.

Liu, "Sparse Convolutional Neural Networks" IEEE, Dec. 2015, 9 pages.

SG Written Opinion in Singaporean Application No. 11201900240W, dated May 6, 2020, 4 pages.

AU Office Action in Australian Application No. 2017295714, dated May 20, 2020, 3 pages.

* cited by examiner

FIG. 5

SUPERPIXEL METHODS FOR CONVOLUTIONAL NEURAL NETWORKS

BACKGROUND

This specification relates to processing inputs through the layers of a neural network to generate outputs.

Neural networks are machine learning models that employ one or more layers of nonlinear units to predict an output for a received input. Some neural networks include one or more hidden layers in addition to an output layer. The output of each hidden layer is used as input to another layer in the network, e.g., the next hidden layer or the output layer. Each layer of the network generates an output from a received input in accordance with current values of a respective set of parameters.

SUMMARY

In general, one innovative aspect of the subject matter described in this specification can be embodied in methods for more efficiently performing a computation of a convolutional neural network layer that is configured to receive an X by Y by Z input tensor and process the received input tensor using one or more convolutional neural network layer weight matrices to generate an U by V by W output tensor. In some aspects the method includes transforming the X by Y by Z input tensor into a X' by Y' by Z' input tensor, wherein X' is smaller than or equal to X, Y' is smaller than or equal to Y, and Z' is larger than or equal to Z; obtaining one or more modified convolutional neural network layer weight matrices, wherein (i) the modified weight matrices operate on the X' by Y' by Z' input tensor to generate a U' by V' by W' output tensor, and (ii) the U' by V' by W' output tensor comprises a transformed U by V by W output tensor, wherein U' is smaller than or equal to U, V' is smaller than or equal to V, and W' is larger than or equal to W; and processing the X' by Y' by Z' input tensor using the modified weight matrices to generate the U' by V' by W' output tensor, wherein the U' by V' by W' output tensor comprises the U by V by W output tensor.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination.

In some implementations X' is equal to the ceiling of X divided by a natural number N, Y' is equal to the ceiling of Y divided by a natural number M, and Z' is equal to Z multiplied by NM.

In some implementations the X by Y by Z input tensor represents XY first inputs and the X' by Y' by Z' input tensor represents X'Y' super inputs with each super input comprising a plurality of first inputs.

In some implementations the number of the plurality of first inputs equals NM inputs.

In some cases the operation of the modified weight matrices on the X' by Y' by Z' input tensor is equivalent to the operation of the convolutional neural network layer weight matrices on the X by Y by Z input tensor.

In some implementations entries of the modified weight matrices comprise one or more convolutional neural network layer weight matrices.

In some cases the modified weight matrices comprise matrices with a banded structure.

In some implementations U' is equal to the ceiling of U divided by a natural number P, V' is equal to the ceiling of V divided by a natural number Q, and W' is equal to W multiplied by PQ.

In some implementations the U by V by W output tensor represents UV first outputs and the U' by V' by W' output tensor represents U'V' super outputs with each super output comprising a plurality of first outputs.

In some cases the plurality of first outputs equals PQ outputs.

In some implementations the convolutional neural network layer comprises a pooling sub layer.

In some cases the method further comprises replacing the pooling sub layer with striding on the transformed input tensor.

In some implementations the convolutional neural network layer includes a stride S in the X dimension and stride T in the Y dimension, and wherein the relationship between stride S, T, output tensor U by V by W and transformed output tensor U' by V' by W' is given by U'=ceiling(U/NS) and V'=ceiling(V/MT).

In some cases the U by V by W output tensor represents UV first outputs and the U' by V' by W' output tensor represents U'V' super outputs with each super output comprising a plurality of first outputs, and the number of first outputs in the plurality of first outputs is dependent on the dimensions of the convolutional neural network layer weight matrices.

In some implementations the U by V by W output tensor represents UV first outputs and the U' by V' by W' output tensor represents U'V' super outputs with each super output comprising a plurality of first outputs, and the number of outputs in the plurality of first outputs is dependent on one or more of (i) the architecture of the convolutional neural network layer, (ii) an architecture of a neural network model including the convolutional neural network layer, or (iii) a device implementing the convolutional neural network layer.

In some cases the modification of the one or more convolutional neural network layer weight matrices is a software only modification.

The subject matter described in this specification can be implemented in particular embodiments so as to realize one or more of the following advantages.

Convolutional neural network layers can be computed using matrix multiplication operations. However, both software libraries and hardware matrix multiplication units may perform with poor efficiency when an input or output depth of the convolutional neural network layer is shallow, since those input and output depths map to the dimensions of one of the matrices being multiplied. As an example, an input image might have RGB data, making for an input depth of 3, and the convolutional neural network layer might produce an output depth of 16.

A standard operation in convolutional neural network layers maps a single input, e.g., a single pixel, to a single row or column of a matrix multiplication operation. A superpixel convolutional neural network layer, as described in this specification, groups multiple inputs, e.g., multiple input pixels, worth of data together, trading spatial extent or indexing (e.g., X and Y dimensions) for depth extent or indexing (e.g., Z dimension). The grouped inputs are more efficiently implemented and processed using a matrix multiplication unit, thus increasing computational efficiency of a system implementing superpixel convolutional neural network layer techniques. For example, a system implementing such techniques may benefit from a higher computation throughput, lower computation latency, shorter I/O transfer time and better energy usage for convolutional neural networks on any matrix machine, e.g., central processing units, graphics processing units or special purpose neural network processing units. In addition, a system may implement the described techniques without modifying system hardware, i.e., the techniques may be implemented entirely using system software, and is therefore applicable for all machines that are used to perform matrix multiplications.

A superpixel convolutional neural network layer, as described in this specification, may include a reduced number of kernel elements than a standard convolutional neural network layer, which in turn may reduce the number of matrix multiplication operations that need to be performed when using the superpixel convolutional neural network layer. In addition, a system implementing superpixel convolutional neural network layers, as described in this specification may transform a convolutional neural network layer with stride greater than one to a superpixel convolutional neural network layer with stride equal to one. A superpixel convolutional neural network layer with stride equal to one may be required for some computer architectures that implement a neural network system, and may operate more efficiently on some architectures, thus increasing computational efficiency and usability.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 5 is an example illustration of convolutional neural network layer weight matrix modification that includes superpixel kernel striding.

Like reference numbers and designations in the various drawings indicate like elements.

DETAILED DESCRIPTION

Figure 1A:
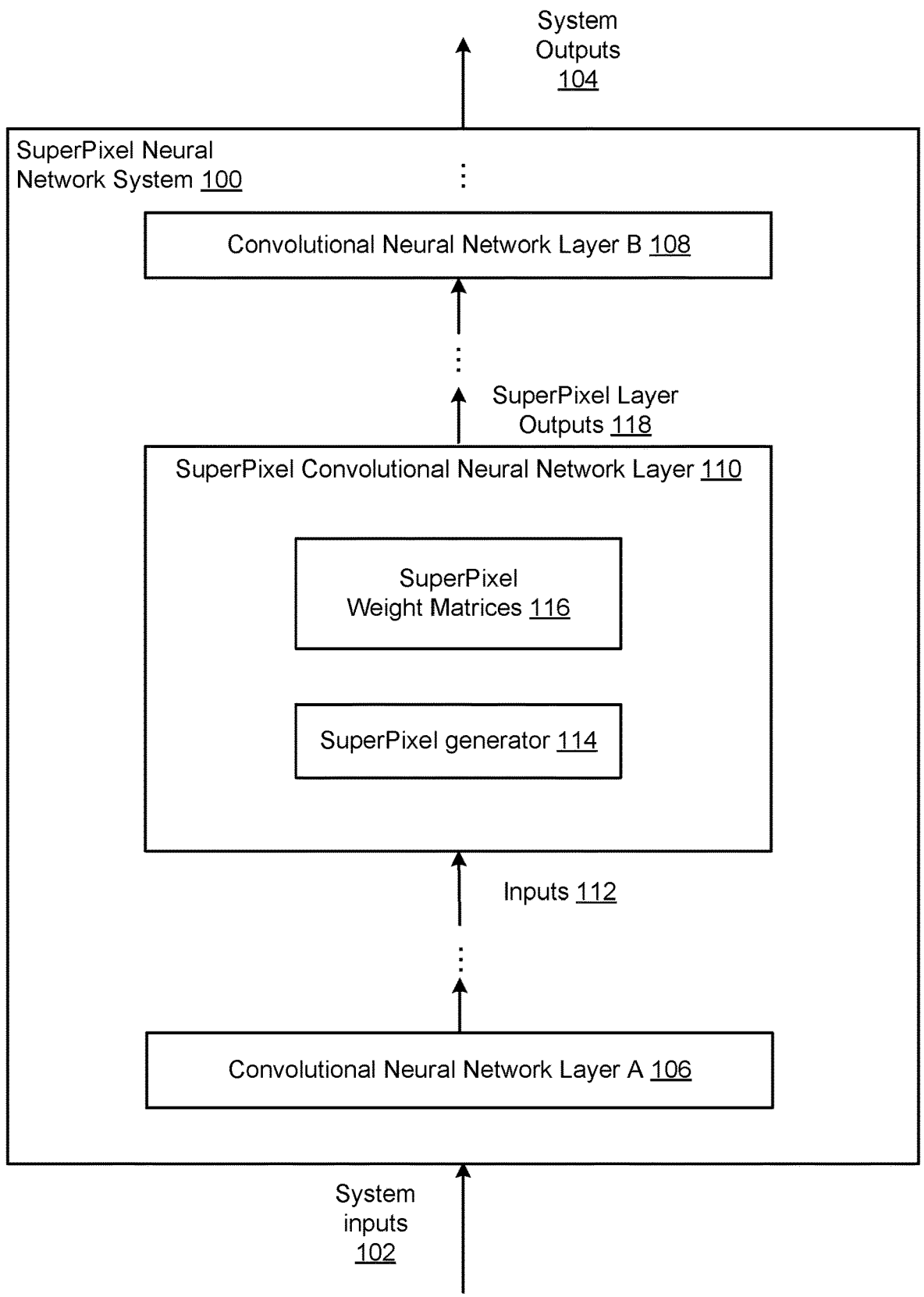
FIG. 1A is an example of a superpixel convolutional neural network system.

FIG. 1A shows an example superpixel convolutional neural network system 100. The superpixel convolutional neural network system 100 is an example of a system implemented as computer programs on one or more computers in one or more locations, in which the systems, components, and techniques described below can be implemented.

The superpixel convolutional neural network system 100 is a machine learning system that receives system inputs 102 and generates system outputs 104 from the system inputs 102.

The superpixel convolutional neural network system 100 can be configured to receive digital data input and to generate a score or classification output based on the input. For example, if the inputs to the superpixel convolutional neural network system 100 are images or features that have been extracted from images, the output generated by the superpixel convolutional neural network system 100, e.g., using one or more fully connected or convolutional neural network layers included in the neural network system 100, for a given image may be scores for each of a set of object categories. Each score may represent an estimated likelihood that the image contains an image of an object belonging to the category.

In particular, the superpixel convolutional neural network system 100 implements a convolutional neural network that includes multiple convolutional neural network layers including convolutional neural network layer A 106, convolutional neural network layer B 108 and superpixel convolutional neural network layer 110. A convolutional neural network layer is a neural network layer whose neurons, or nodes, are logically arranged in a three dimensional array: width, height and depth. Neurons inside a convolutional neural network layer are connected to a small region of the layer preceding the convolutional neural network layer, called a receptive field or kernel patch, and each neuron inside a convolutional neural network layer detects the same feature, constituting the property of translation invariance. A convolutional neural network layer may be associated with respective weight matrices, or kernels, that store current values of the parameters of the layer. The layer generates outputs from inputs in accordance with current values of the parameters for the neural network layer, e.g., by performing multiple matrix multiplication operations. Example convolutional neural network layers are described in more detail in "Large-scale Video Classification with Convolutional Neural Networks," Andrej Karpathy, George Toderici, Sanketh Shetty, Thomas Leung, Rahul Sukthankar and Li Fei-Fei, *Proceedings of International Computer Vision and Pattern Recognition (CVPR* 2014), *IEEE*.

Each of the layers of the superpixel convolutional neural network are configured to receive a respective layer input and process the layer input to generate a respective layer output from the input. For example, the convolutional neural network layers included in the superpixel convolutional neural network system 100 may be configured to receive an X by Y by Z input tensor and process the received input tensor using one or more respective convolutional neural network layer weight matrices, or kernels, to generate an U by V by W output tensor. A tensor is a multidimensional array of numeric or other values, e.g., strings, having a specific order that corresponds to the dimensionality of the array. For example, a scalar value is a 0th-order tensor, a vector of numeric values is a 1st-order tensor, and a matrix is a 2nd-order tensor.

For example, a convolutional neural network layer may be configured to receive a 64 by 64 by 3 input tensor representing an image including 64×64 pixels of feature depth 3, where the feature depth is represented by red, green and blue feature channels. The convolutional neural network layer may process the received 64 by 64 by 3 input tensor using one or more respective convolutional neural network layer matrices to generate a respective output tensor.

In some implementations the convolutional neural network layer may include one or more hyperparameters that control the size and output volume of the convolutional neural network layer. For example, the convolutional neural network layer may include a kernel stride that controls how much convolutional filters, or weight matrices, shift in X and Y between evaluations of the filters against the input data. In some implementations the convolutional neural network layer may include or be connected to a pooling layer—a form of nonlinear down sampling. For example, the convolutional neural network layer may include a pooling stride that operates on depth slices of the input tensor and spatially resizes the input tensor. Continuing the example above, the convolutional neural network layer may therefore generate a respective U by V by W output tensor where U is smaller than or equal to X, V is smaller than or equal to Y and W is larger than or equal to Z, e.g., a 32 by 32 by 32 output tensor (e.g., corresponding to a 7 by 7 kernel stride and a 2 by 2 pooling stride). Generally, kernel striding can be considered as omitting original computations (e.g., "skip by 2 in X and 2 in Y between evaluations",) while pooling is a post-pass after stride-1 evaluation (e.g., in pooling, computations are produced with a stride of land a maximum value out of each group in the pooling window is selected, e.g., 2×2 part of input data.)

At least one convolutional neural network layer included in the superpixel neural network system 100 is a superpixel convolutional neural network layer, e.g., superpixel convolutional neural network layer 110. A superpixel convolutional neural network layer is a convolutional neural network layer that applies a superpixel transformation (alternatively referred to as modification) to received convolutional layer inputs and convolutional neural network layer weight matrices in order to generate a differently shaped, but mathematically equivalent, superpixel convolutional neural network layer.

The superpixel convolutional neural network layer 110 may receive inputs, e.g., inputs 112, from a convolutional neural network layer that precedes the superpixel convolutional neural network layer 110, e.g., the received inputs may include outputs generated by a convolutional neural network layer that precedes the superpixel convolutional neural network layer 110.

The superpixel convolutional neural network layer 110 may include a superpixel generator 114. The superpixel generator 114 is configured to receive convolutional neural network inputs and transform the received inputs into superpixel layer inputs. The superpixel generator 114 groups multiple components of a received input together, trading spatial extent or indexing, e.g., X and Y dimensions, for depth extent or indexing, e.g., Z dimension.

Figure 3:
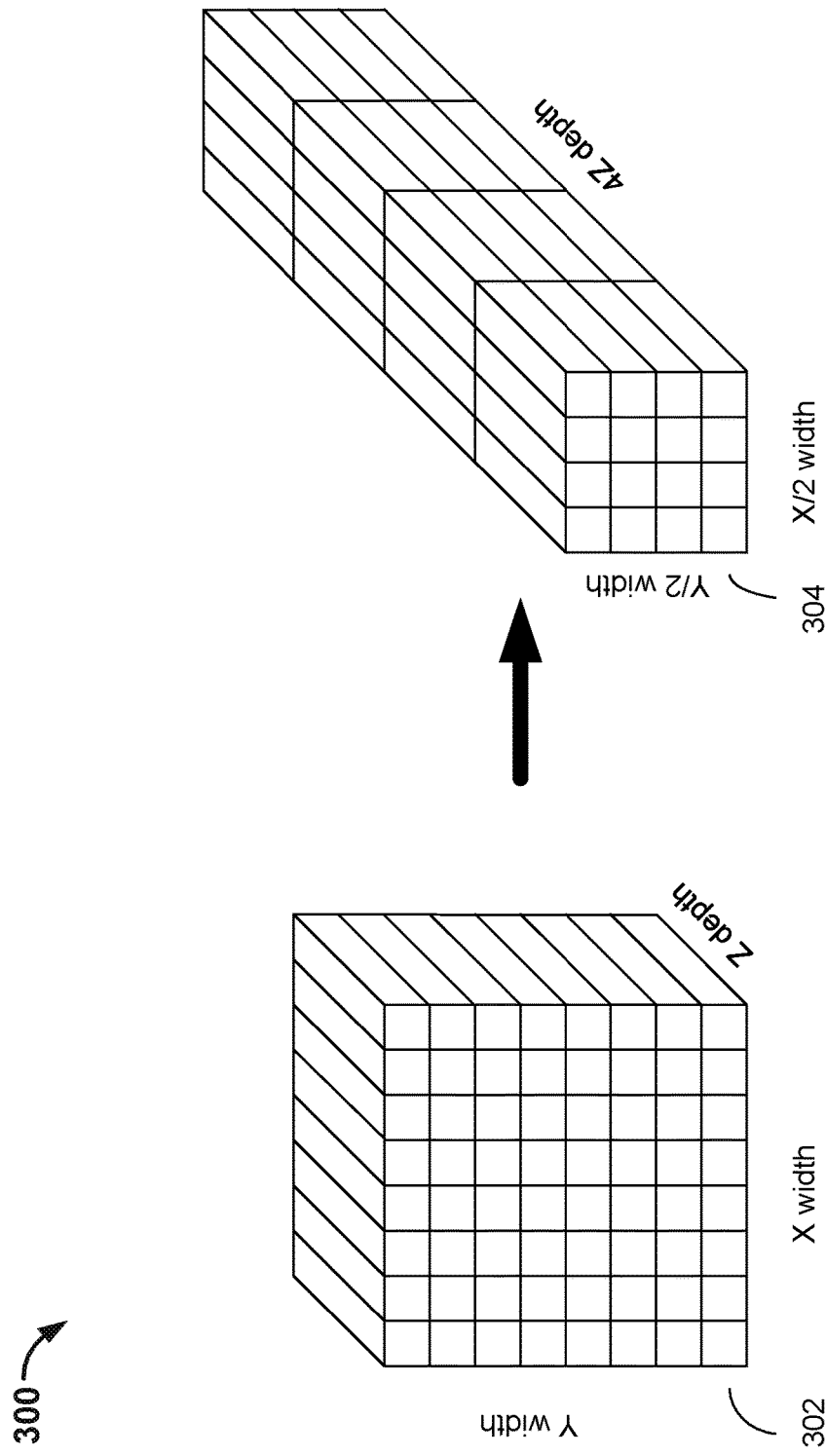
FIG. 3 is an example illustration of superpixel input tensor transformation.

For example, superpixel convolutional neural network layer 110 may receive as input an X by Y by Z input tensor, e.g., representing XY (X multiplied by Y) pixels of depth Z. The superpixel generator 114 is configured to transform the X by Y by Z input tensor into a X' by Y' by Z' superpixel input tensor, where X' is smaller than or equal to X, Y' is smaller than or equal to Y, and Z' is larger than or equal to Z. An example superpixel input tensor transformation as performed by a superpixel generator is illustrated in FIG. 3 below.

The superpixel convolutional neural network layer 110 includes superpixel weight matrices 116. The superpixel weight matrices 116 are modified (alternatively referred to as transformed) convolutional neural network layer weight matrices that correspond to the convolutional neural network layer. For example, the convolutional neural network layer weight matrices may be modified accordingly in response to selecting a respective convolutional neural network layer to transform into a superpixel convolutional neural network layer. The superpixel weight matrices 116 operate on transformed convolutional neural network layer inputs.

For example, a convolutional neural network layer corresponding to the superpixel neural network layer 110 may be configured to receive an X by Y by Z input tensor. The superpixel neural network layer 110 may transform a received input into an X' by Y' by Z' superpixel input tensor. In this case the superpixel weight matrices may include modified weight matrices that operate on the X' by Y' by Z' input tensor to generate a U' by V' by W' output tensor, where X' is not necessarily equal to U', Y' is not necessarily equal to V' and Z' is not necessarily equal to W'. The U' by V' by W' output tensor is a transformed U by V by W output tensor, where U' is smaller than or equal to U, V' is smaller than or equal to V, and W' is larger than or equal to W. For example, the U' by V' by W' output tensor may represent a superpixel output tensor, e.g., grouped components of a U by V by W output tensor. In some implementations the groupings used to create a superpixel input tensor or to represent a superpixel output tensor may not be the same, e.g., the number of components and way in which the components are grouped together may differ. An example convolutional neural network layer weight matrix modification is illustrated below with reference to FIG. 4. In addition, an example algorithm (including comments) for generating superpixel weight matrices (with striding or without striding, e.g., stride_x=stride_y=1) is given below:

```
SuperPixel::Weights SuperPixel::MakeWeights(const Weights
&weights) {
    const int kOutPixelX = pixel_x_ / stride_x_;
    const int kOutPixelY = pixel_y_ / stride_y_;
    const int kKernelX = weights[0].size( ); // Note swap of KX/KY.
    const int kKernelY = weights.size( );
    const int kInputZ = weights[0][0].size( );
    const int kOutputZ = weights[0][0][0].size( );
    const int kSuperKX = MathUtil::CeilOfRatio(pixel_x_ +
kKernelX - 1, pixel_x_);
    const int kSuperKY = MathUtil::CeilOfRatio(pixel_y_ +
kKernelY - 1, pixel_y_);
    Weights super =
        DimensionAndZero<int8>(kSuperKY, kSuperKX, kInputZ *
pixel_x_ * pixel_y_,kOutputZ * kOutPixelX * kOutPixelY);
    // kx: the kernel index in the X dimension.
    // ky: the kernel index in the Y dimension.
    // iz: the input depth (Z dimension).
    // oz: the output depth, (Z dimension).
    for (int kx = 0; kx < kKernelX; ++kx) {
        for (int ky = 0; ky < kKernelY; ++ky) {
            for (int iz = 0; iz < kInputZ; ++iz) {
                for (int oz = 0; oz < kOutputZ; ++oz) {
                    // Each original weight will get copied to
                    kOutPixelX*kOutPixelY
                    // locations in the superpixel weight matrices.
                    int8 weight = weights[ky][kx][iz][oz];
                    // iterate over opx and opy to ensure that exactly
                    // that many copies of the original weight are made.
                    // This is achieved by computing the addressing
relationships for each
                    // output pixel within the output superpixel, using the
contribution
                    // for the original weight at [ky][kx][iz][oz], to determine
                    // just which input pixel inside each input superpixel
                    // works with that weight. This shows where in the
                    // superpixel weight matrices to drop this copy of the
                    // weight.
                    // opx: The output pixel index, inside the output superpixel.
                    // ix: the input x pixel index that provides the data for this
```

```
opx.
            // skx: the superpixel kernel index in the
            X dimension.
            // pkx: the pixel index inside the superpixel in the
            X dimension.
            for (int opx = 0; opx < kOutPixelX; ++opx) {
              int ix = opx * stride_x__ + input_offset_x__ + kx;
              int skx = ix / pixel_x__;
              int pkx = ix % pixel_x__;
              for (int opy = 0; opy < kOutPixelY; ++opy) {
                // iy, sky, and pky are similar to their X counterparts.
                int iy = opy * stride_y__ + input_offset_y__ + ky;
                int sky = iy / pixel_y__;
                int pky = iy % pixel_y__;
                // siz is the superpixel input depth. It folds together the
pkx,
                // pky, and iz dimensions, all of which are indexing
input data
                // within the range seen by superpixel kernel element
(skx,sky).
                int siz = SuperIndex(pkx, pky, iz);
                // soz is the superpixel output depth. It folds together
                // the opx, opy, and oz dimensions, all of which are
                // describing columns being addeed up within the
single output superpixel.
                int soz = SuperIndex(opx, opy, oz, kOutPixelX,
                    kOutPixelY);
                super[sky][skx][siz][soz] = weight;
              }
            }
          }
        }
      }
    }
    return super;
```

Example SuperIndex routines as used in the above may be defined by, but are not limited to, the below:

```
int SuperPixel::SuperIndex(int x, int y, int z) const {
  return SuperIndex(x, y, z, pixel_x__, pixel_y__);
}
int SuperPixel::SuperIndex(int x, int y, int z, const int kPixelX,
                const int kPixelY) {
  DCHECK_LT(x, kPixelX);
  DCHECK_LT(y, kPixelY);
  return (z * kPixelY + y) * kPixelX + x;
}
```

The above is for illustrative purposes only. For example, in some implementations the SuperIndex routine may not depend on a packing order inside the superpixel.

The superpixel convolutional neural network layer 110 processes transformed input tensors using modified weight matrices to generate a transformed convolutional neural network layer output, e.g., superpixel layer output 118. The generated transformed convolutional neural network layer output may be mathematically equivalent to a neural network output generated by processing an untransformed convolutional neural network input using unmodified convolutional neural network layer weight matrices. All of the output values of an unmodified computation may be present in the generated transformed convolutional neural network layer output in such a form that they can be computed by performing an inverse homomorphism transformation, as described below with reference to FIG. 1B. For example, the generated transformed convolutional neural network layer output may include a superset of outputs that includes a neural network output that corresponds to the neural network output generated by processing an (untransformed) convolutional neural network input using the (unmodified) convolutional neural network layer. In some implementations the additional outputs included in the superset may be provided to subsequent layers of the superpixel neural network system 100. For example, additional outputs may correspond to "partial sums" for outputs that are "off the edge" of an originally requested, untransformed output. The partial sums can be saved and reused for higher efficiency if a superpixel computation is handling one "tile" of a larger computation with much bigger X and Y than are efficient to handle in a single superpixel computation. Processing an input using a superpixel convolutional neural network layer is described in more detail below with reference to FIG. 2.

In some implementations the superpixel convolutional neural network layer 110 may include a superpixel unformatter that is configured to receive superpixel outputs and transform the received superpixel outputs into normally ordered outputs. For example, if a current superpixel convolutional neural network layer produces 4×4 superpixel outputs, whereas a next superpixel convolutional neural network layer is configured to process 8×8 superpixels, the system may use a superpixel unformatter to transform from 4×4 superpixels to 8×8 superpixels. In some implementations a superpixel unformatter for a superpixel convolutional neural network layer, e.g., layer 110, may follow the superpixel weight matrices, e.g., weight matrices 116, and ungroup outputs generated by the weight matrices. In other implementations a superpixel unformatter for a superpixel convolutional neural network layer may be included with or as part of a superpixel generator for a next superpixel convolutional neural network layer in a sequence of superpixel convolutional neural network layers.

The superpixel convolutional neural network layer 110 may be included at various locations in the sequence of neural network layers and, in some implementations, multiple superpixel convolutional neural network layers may be included in the sequence. For example, in some implementations one or more of convolutional neural network layers A and B may be superpixel convolutional neural network layers. In implementations where multiple superpixel convolutional neural network layers are included in the sequence of neural network layers, each superpixel convolutional neural network layer may apply a respective transformation to received inputs to generate respective super inputs, where the generated respective super inputs may include super inputs of different sizes.

An example layout for a system of multiple superpixel convolutional neural network layers is represented in the table below:

| Layer | Superpixels per Layer (X × Y) | Pixels per Superpixel | Original input depth Z | Transformed input depth U |
|---|---|---|---|---|
| Conv0/Stride2 | 8 × 8 | 8 × 8 | 3 | 192 |
| Conv1/Stride2 | 8 × 8 | 4 × 4 | 16 | 256 |
| Conv2 | 8 × 8 | 2 × 2 | 32 | 128 |
| Conv3 | 8 × 8 | 2 × 2 | 64 | 256 |
| Conv4/Stride2 | 8 × 8 | 2 × 2 | 64 | 256 |
| Output | 4 × 4 | 2 × 2 | 64 | 256 |

In the above example layout, most neural network layers include an 8×8 set of superpixels per layer. The number of pixels per superpixel is adjusted in response to the kernel striding. The 'original input depth (Z)' column specifies the depth of the input in the original neural network model, while the 'transformed input depth (U)' column specifies the depth of the input after transforming the input and weights using the specified pixels per superpixel.

A second example layout for a system of multiple superpixel convolutional neural network layers is represented in the table below:

| Layer | Superpixels per Layer (X × Y) | Pixels per Superpixel | Original input depth Z | Transformed input depth U |
|---|---|---|---|---|
| Conv0 | X × Y | 4 × 4 | 3 | 48 |
| Conv1 | X × Y (2 dead pixels at high-X and high-Y) | 4 × 4 | 16 | 256 |
| Conv2 | (X-1) × (Y-1) | 4 × 4 | 16 | 256 |
| Output | (X-2) × (Y-2) (3 dead pixels at high--X and high-Y) | 4 × 4 | 5 | 80 |

The superpixel convolutional neural network system 100 can be trained on multiple batches of training examples in order to determine trained values of the parameters of the neural network layers, i.e., to adjust the values of the parameters from initial values to trained values. For example, during the training, the superpixel convolutional neural network system 100 can process a batch of training examples and generate a respective neural network output for each training example in the batch. The neural network outputs can then be used to adjust the values of the parameters of the components of the superpixel convolutional neural network system 100, for example, through conventional gradient descent and backpropagation neural network training techniques. Since modified weight matrices make NM copies of each original weight, where N and M represent superpixel sizes as described below with reference to step 202 of FIG. 2, during a backpropagation training process the system may add weight gradients across all NM copies to determine a net change in value for each original weight. Superpixel neural network layer training is an inverse process where depth extent or indexing may be traded for spatial extent or indexing.

Once the neural network has been trained, the superpixel convolutional neural network system 100 may receive a new neural network input for processing and process the neural network input through the neural network layers to generate a new neural network output for the input in accordance with the trained values of the parameters of the components of the superpixel convolutional neural network system 100.

In some implementations the superpixel neural network system 100 may include one or more deconvolutional neural network layers. In these cases the components and techniques described above may be inversed to achieve the same effect, namely a superpixel deconvolutional neural network layer may group multiple inputs together, trading depth extent or indexing for spatial extent or indexing, and may modify respective deconvolutional neural network layer weight matrices accordingly.

Figure 1B:
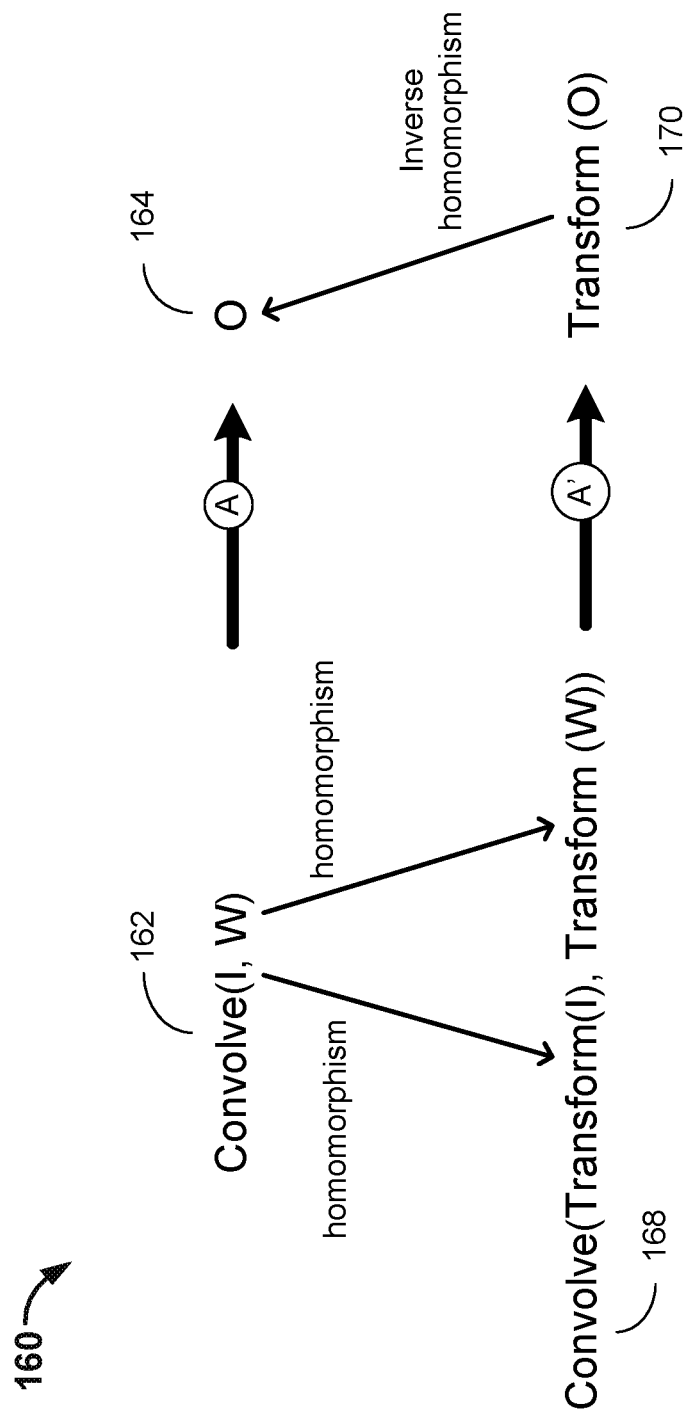
FIG. 1B is a diagram showing the relationship between a convolutional neural network layer and a superpixel convolutional neural network layer.

FIG. 1B is a diagram 160 showing the relationship between a convolutional neural network layer and a superpixel convolutional neural network layer.

As shown in diagram 160, a convolutional neural network layer may be configured to perform a convolution operation "convolve" 162 on input activations I and weight matrices W to generate layer output activations O 164.

Similarly, a superpixel convolutional neural network layer, e.g., a modified or transformed convolutional neural network layer as described above with reference to FIG. 1A, may be configured to perform a convolution operation "convolve" 168 on transformed input activations Transform (I) and transformed weight matrices Transform(W) to generate transformed layer output activations 170.

Diagram 160 show two homomorphism arrows connecting inputs I to transformed inputs Transform(I) and weight matrices W to transformed weight matrices Transform(W), respectively. The homomorphism arrows represent the homomorphic relationship between the original convolutional neural network layer and the modified convolutional neural network layer. The arrows map, for example, original model activations and weights to modified or transformed model activations and weights. Similarly, diagram 160 shows an inverse homomorphism arrow connecting transformed outputs Transform(O) to outputs O. The inverse homomorphism represents an inverse homomorphic relationship between the original convolutional neural network layer and the modified convolutional neural network layer. The arrow maps, for example, transformed outputs back to original outputs.

An example algorithm for transforming original model activations is given below:

```
SuperPixel::Activations SuperPixel::TransformIn(const Activations
    &inputs) {
    const int kBatch = inputs.size( );
    const int kInputY = inputs[0].size( );
    const int kInputX = inputs[0][0].size( );
    const int kInputZ = inputs[0][0][0].size( );
    // Round up to the nearest superpixel count that fits.
    const int kSuperX = MathUtil::CeilOfRatio(kInputX, pixel_x_);
    const int kSuperY = MathUtil::CeilOfRatio(kInputY, pixel_y_);
    const int kSuperZ = kInputZ * pixel_y_ * pixel_x_;
    Activations supered =
        DimensionAndZero<float>(kBatch, kSuperY, kSuperX, kSuperZ);
    for (int b = 0; b < kBatch; ++b) {
        for (int iy = 0; iy < kInputY; ++iy) {
            for (int ix = 0; ix < kInputX; ++ix) {
                for (int iz = 0; iz < kInputZ; ++iz) {
                    int sx = ix / pixel_x_;
                    int sy = iy / pixel_y_;
                    int py = iy % pixel_y_;
                    int px = ix % pixel_x_;
                int sz = SuperIndex(px, py, iz);
                supered[b][sy][sx][sz] =
                    inputs[b][iy][ix][iz];
                }
            }
        }
    }
    return supered;
}
```

An example algorithm for an inverse homomorphism is given below:

```
SuperPixel::Activations SuperPixel::TransformOut(const ActivationDims
    &desired,
                                const Activations &supered) {
    const int kBatch = supered.size( );
    const int kInputY = supered[0].size( );
    const int kInputX = supered[0][0].size( );
    const int kInputZ = supered[0][0][0].size( );
    const int kOutputZ = kInputZ / (pixel_x_ * pixel_y_);
    CHECK_EQ(kInputZ % (pixel_x_ * pixel_y_), 0);
    CHECK_EQ(desired.batch, kBatch);
    CHECK_LE(desired.x, kInputX * pixel_x_);
    CHECK_LE(desired.y, kInputY * pixel_y_);
    Activations normal =
        DimensionAndZero<float>(kBatch, desired.y, desired.x,
        kOutputZ);
    for (int b = 0; b < kBatch; ++b) {
        for (int iy = 0; iy < desired.y; ++iy) {
            for (int ix = 0; ix < desired.x; ++ix) {
                for (int iz = 0; iz < kOutputZ; ++iz) {
```

```
        // Divide ix and iy into superpixel and pixel components.
        int sx = ix / pixel_x_;
        int sy = iy / pixel_y_;
        int px = ix % pixel_x_;
        int py = iy % pixel_y_;
        int spz = SuperIndex(px, py, iz);
        normal[b][iy][ix][iz] = supered[b][sy][sx][spz];
      }
    }
  }
}
return normal;
}
```

As shown in diagram 160, the number of operations required to generate a convolutional neural network layer output using a superpixel convolutional neural network layer may be larger than the number of operations required by corresponding original neural network layer since the inputs I and weight matrices W may need to be transformed before the convolution is applied. However, due to superpixel convolutional neural network layer architecture performing the larger number of operations may be computationally faster at runtime than the smaller number of operations performed by the corresponding original neural network layer.

Figure 2:
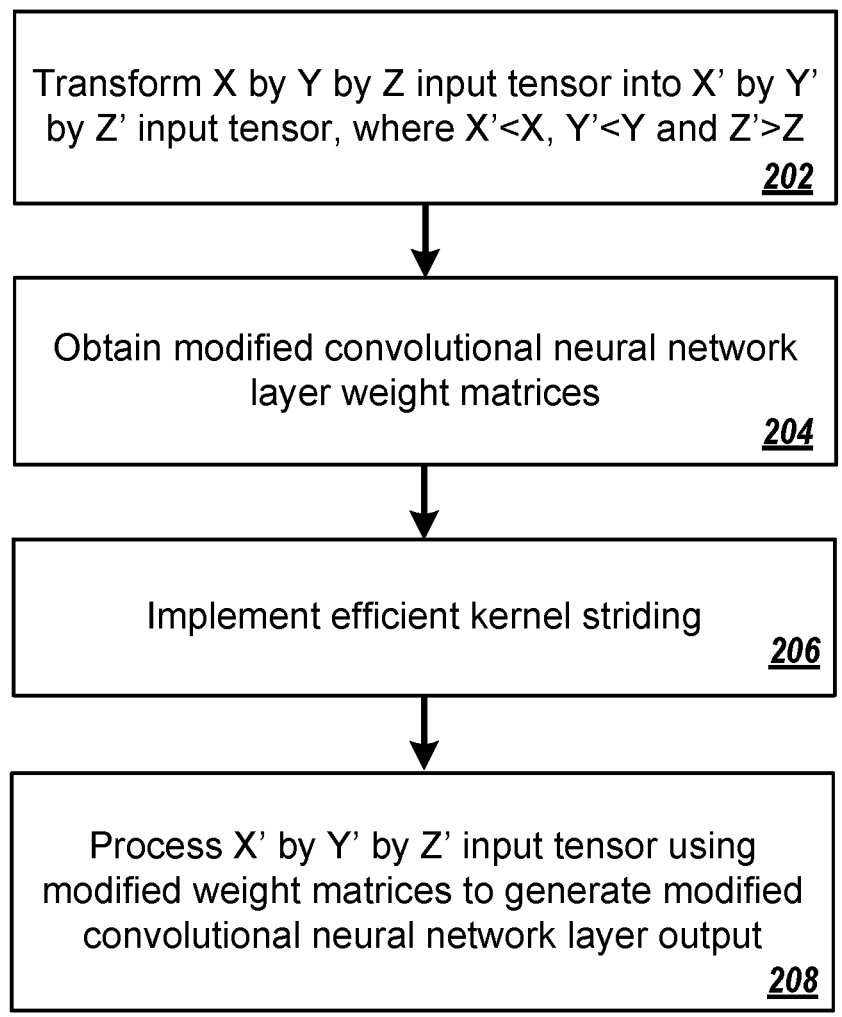
FIG. 2 is a flow diagram of an example process for efficiently performing a computation of a convolutional neural network layer.

FIG. 2 is a flow diagram of an example process 200 for efficiently performing a computation of a convolutional neural network layer that is configured to receive an X by Y by Z input tensor and process the received input tensor using one or more convolutional neural network layer weight matrices to generate an U by V by W output tensor. For convenience, the process 200 will be described as being performed by a system of one or more computers located in one or more locations. For example, a superpixel convolutional neural network system, e.g., the superpixel convolutional neural network system 100 of FIG. 1A, appropriately programmed in accordance with this specification, can perform the process 200.

The system transforms the X by Y by Z input tensor into an X' by Y' by Z' superpixel input tensor (step 202). The system transforms the input tensor by grouping multiple inputs together, trading spatial extent or indexing for depth extent or indexing. For example, the X' by Y' by Z' input tensor may have different dimensions than the X by Y by Z input tensor. More specifically, X' may be smaller than or equal to X, Y' may be smaller than or equal to Y, and Z' may be larger than or equal to Z. In some implementations X' is equal to the ceiling of X divided by a natural number N, e.g., the smallest integer greater than or equal to X divided by a natural number N, Y' is equal to the ceiling of Y divided by a natural number M, and Z' is equal to Z multiplied by NM.

The X by Y by Z input tensor may represent XY first inputs. For example, the X by Y by Z input tensor may represent an image of X by Y pixels of feature depth Z. Similarly, the X' by Y' by Z' input tensor may represent X'Y' super inputs with each super input including multiple first inputs. For example, the X' by Y' by Z' input tensor may represent an image of X' by Y' superpixels of depth Z'. In some implementations the number of the multiple first inputs equals NM inputs, e.g., each super input may be composed of NM first inputs. An example transformation of input tensors is illustrated in FIG. 3 below.

The system obtains one or more modified convolutional neural network layer weight matrices (step 204). The modified weight matrices operate on the X' by Y' by Z' input tensor to generate a U' by V' by W' output tensor. In some implementations the operation of the modified weight matrices on the X' by Y' by Z' input tensor is equivalent to the operation of the convolutional neural network layer weight matrices on the X by Y by Z input tensor, e.g., the operation of the modified weight matrices on the X' by Y' by Z' input tensor achieves a same effect. The U' by V' by W' output tensor may include a transformed U by V by W output tensor, where U' is smaller than or equal to U, V' is smaller than or equal to V, and W' is larger than or equal to W. For example, the U' by V' by W' output tensor may represent grouped multiple outputs from the U by V by W output tensor, where spatial extent or indexing has been traded for depth extent or indexing, as described above.

The entries of the modified weight matrices include one or more convolutional neural network layer weight matrices, e.g., the modified weight matrices may include block matrices that may be interpreted as being broken into sections called blocks or submatrices. In some implementations the entries of the modified weight matrices may exhibit a banded structure. For example, a convolutional neural network layer may be represented by a fully connected matrix where each input is connected to each output. The fully connected matrix exhibits a banded structure, where most entries of the matrix are zero with a small number of diagonal bands in the matrix having nonzero entries.

Generally, for one dimension, a number of modified kernel elements may be equal to ceiling((superinput_size+original convolutional neural network layer kernel width−1)/superinput_size). Convolutional neural network layer weight matrix modification is illustrated below with reference to FIG. 4.

Optionally, the system may implement efficient kernel striding to the convolutional neural network layer (step 206). For example, in some implementations the convolutional neural network layer may include a pooling sub layer. In these cases the system may replace the pooling sub layer with striding on the transformed input tensor X' by Y' by Z'. For example, as described below with reference to step 208, in some implementations the U by V by W output tensor may represent UV first outputs and the U' by V' by W' output tensor may represent U'V' super outputs with each super output including multiple first outputs. In such cases the implemented efficient kernel striding size may not be equal to the number of outputs in the multiple first outputs. The effects of kernel striding may be combined into the modified weight matrices. For example, a (untransformed) convolutional neural network layer may generate a layer output O by applying a convolution to a respective input I and respective weight matrices W and applying striding to the convolved input I and weight matrices W, i.e., by performing two operations. A transformed superpixel convolutional neural network layer with striding may generate a transformed layer output transform(O) by applying a convolution to a transformed respective input transform(I) and strided, transformed weight matrices strided_transform(2,W).

In some implementations the convolutional neural network layer may already include kernel striding. In these cases the system may replace the kernel striding with efficient kernel striding. The system may implement efficient kernel striding by using different input and output superpixel sizes, where the ratio of the superpixel sizes is equal to the stride. For example, if a convolutional neural network layer includes a stride S in the X dimension and a stride T in the Y dimension, and the convolutional neural network layer is transformed into a superpixel convolutional neural network layer with superpixel inputs of size NM, by choosing an output superpixel size of (N/S)(M/T), the system implements kernel striding of the superpixel modified weight matrices. In some implementations the relationship between stride S, output tensor U by V by W and transformed output tensor U' by V' by W' may be given by U'=ceiling(U/NS) and V'=ceiling(V/MT). Implementing efficient kernel striding is illustrated below with reference to FIG. 5.

The system processes the X' by Y' by Z' input tensor using the modified weight matrices to generate a transformed convolutional neural network layer output, e.g., a U' by V' by W' output tensor (step 208). The U' by V' by W' output tensor includes the U by V by W output tensor, e.g., the U' by V' by W' output tensor may include a superset of outputs that contains the U by V by W output tensor.

The U' by V' by W' output tensor may have different dimensions to the U by V by W output tensor. More specifically, U' may be equal to the ceiling of U divided by a natural number P, V' may be equal to the ceiling of V divided by a natural number Q, and W' may be equal to W multiplied by PQ. In some implementations the natural numbers P and Q may be equal to the natural numbers N and M described above with reference to step 202, respectively. In addition, in some implementations a P and Q of a current superpixel convolutional neural network layer may be equal to an N and M of a subsequent superpixel convolutional neural network layer, e.g., if the system does not include superpixel generators and superpixel unformatters between the current superpixel convolutional neural network layer and the subsequent superpixel convolutional neural network layer.

The U by V by W output tensor may represent UV, first outputs of depth W. For example, the U by V by W output tensor may represent a feature map of U by V outputs of depth W. Similarly, the U' by V' by W' output tensor may represent U'V' super outputs with each super output including multiple first outputs. For example, the U' by V' by W' output tensor may represent an image of U' by V' pixels of depth W'. In some implementations the number of the multiple first outputs equals P×Q output pixels, e.g., each super output may be composed of PQ first outputs.

The natural numbers P and Q may differ to the natural numbers N and M described above with reference to step 202. For example, the size of the super inputs described above may not be equal to the size of the super outputs. In some implementations the number of first outputs in the multiple first outputs, e.g., the size of the super outputs, is dependent on the dimensions of the convolutional neural network layer weight matrices. In some implementations the number of outputs in the multiple first outputs is dependent on one or more of (i) the architecture of the convolutional neural network layer, (ii) an architecture of a neural network model including the convolutional neural network layer, or (iii) a device implementing the convolutional neural network layer.

As an example, suppose an original convolutional layer has input size X by Y by Z, and produces output size U by V by W, and a superpixel-transformed convolutional layer has input size X' by Y' by Z', and produces output size U' by V' by W'. Let KL represent a number of convolutional kernel elements in the weight matrices and K'L' represent a number of convolutional kernel elements in the modified weight matrices. Suppose further that the input and output pixels/superpixel are the same, and are specified by N and M. Then U'=ceiling(U/N), V'=ceiling(V/M), and W'=W×N×M. In addition, K'=ceiling((N+K−1)/N) and L'=ceiling((M+L−1)/N). Cases where PQ may not be equal to NM include cases where the system may be implementing kernel striding or if the number of pixels per transformed superpixel change from input to output.

FIG. 3 is an example illustration 300 of superpixel input tensor transformation. For example, the example illustration shows a superpixel input tensor transformation as described above with reference to step 202 of FIG. 2. The illustrated transformation may be performed by a system of one or more computers located in one or more locations. For example, a superpixel generator, e.g., the superpixel generator 114 of FIG. 1A, appropriately programmed in accordance with this specification, can perform the illustrated transformation.

The example illustration shows an example X by Y by Z input tensor 302. As shown in FIG. 3, the input tensor includes XY inputs, each of depth Z. As described above with reference to FIG. 2, the X by Y by Z input tensor may be transformed into an X' by Y' by Z' superpixel input tensor by grouping multiple inputs together. During the grouping, indexing or layout in the spatial dimensions (X and Y dimensions) are traded for indexing or extent in the depth dimension (Z dimension). In the example illustration 300, the X by Y by Z input tensor has been transformed into an X/2 by Y/2 by 4Z superpixel input tensor 304. As shown in FIG. 3, the superpixel input tensor includes (X/2)(Y/2) inputs, each of depth 4Z. Each superpixel input included in the input tensor 304 represents 4 original inputs, and therefore represents 4 times the amount of data represented by an original input.

Figure 4:
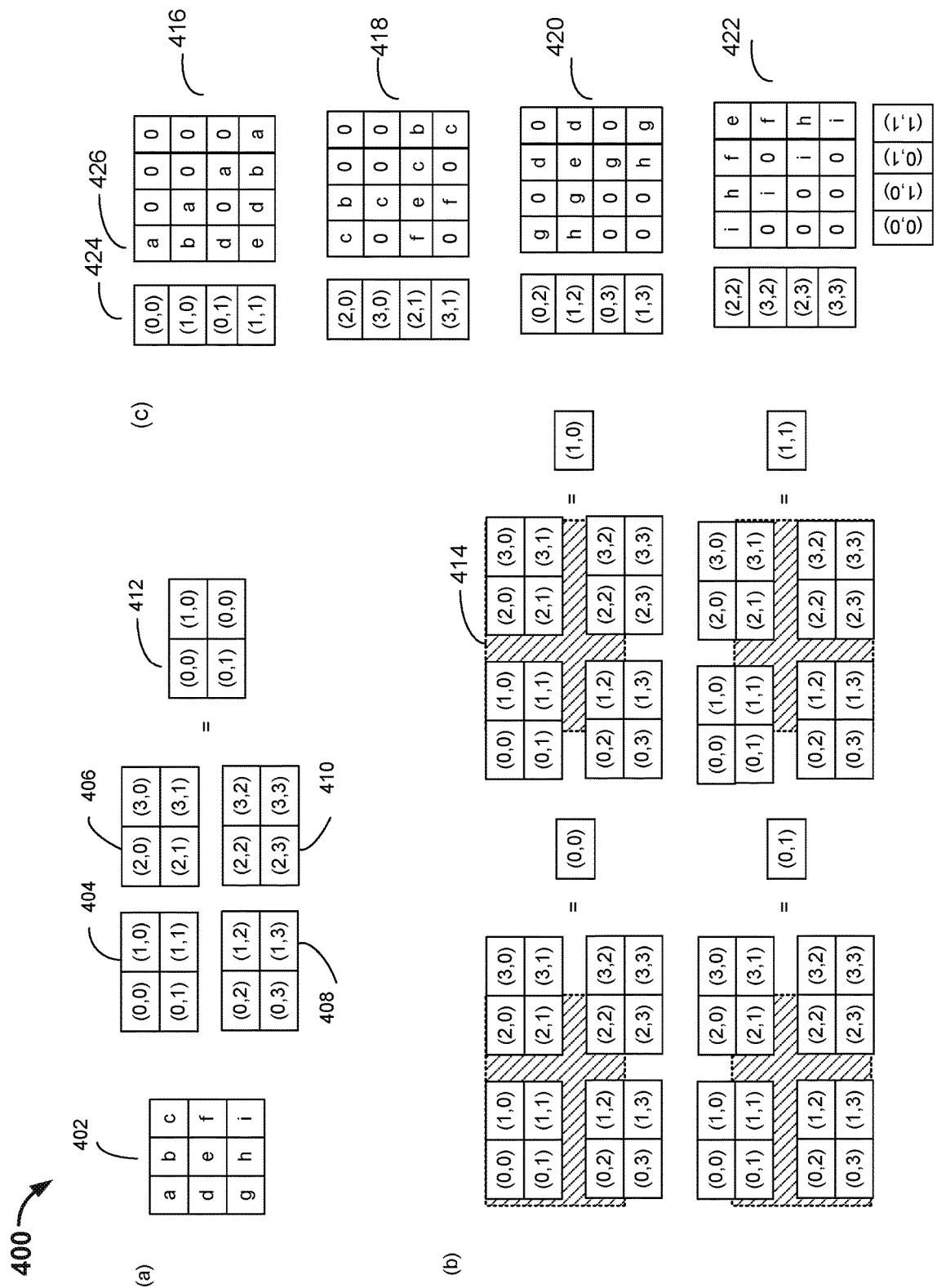
FIG. 4 is an example illustration of convolutional neural network layer weight matrix modification.

FIG. 4 is an example illustration 400 of convolutional neural network layer weight matrix modification. For example, the example illustration shows a convolutional neural network layer weight modification as described above with reference to step 204 of FIG. 2. The illustrated modification may be performed by a system of one or more computers located in one or more locations. For example, a superpixel convolutional neural network layer, e.g., the superpixel convolutional neural network layer 110 of FIG. 1A, appropriately programmed in accordance with this specification, can perform the illustrated modification.

At step (a), the example illustration 400 shows a 3 by 3 kernel patch 402 for a convolutional neural network layer, where each element of the kernel patch includes a two-dimensional weight matrix with dimensions equal to the original input depth by the original output depth, e.g., Z by W, that is suitable for matrix multiplication. The example illustration further shows four 2 by 2 grids 404-410 that represent inputs. The inputs are grouped into 2 by 2 super inputs, each super input including 2 by 2 original inputs. The example illustration shows a super output 412 including four original outputs.

At step (b), the example illustration 400 shows the same two dimensional convolution as illustrated at step (a) expanded into a dot product calculation for each of the four original outputs. The shading, e.g., shading 414, behind the 2 by 2 grids illustrates which 3 by 3 subset of the input data affects each output. As shown by the shading for each grid, every super input affects every output, but the useful fraction of each super input is 9/16.

At step (c), the example illustration 400 shows example modified two-dimensional weight matrices 416-422 that may be used to compute the super output. Each of the matrices 416-422 are kernel elements that together make up a 2 by 2 modified kernel patch. The dimensions of the matrices 416-422 is 4Z by 4W, therefore 16 times bigger than the original two dimensional matrices of the kernel patch 402. The vertical axis represents input depth, inputs within super inputs and kernel elements. The horizontal axis represents output depth and outputs within super outputs. The example illustration at step (c) depicts a matrix multiplication. The column 424 represents inputs, and when an input is illustrated as being a same height as an entry of the modified weight matrices 416-422 it is multiplied by that weight. All of the weight-input products in a column may be added up to produce a total value for the output within the super output. In total there are four super inputs illustrated, e.g., 16 original inputs, contributing to calculate one super output, e.g., 4 original outputs.

Each of the four super inputs have different X and Y coordinate relationships to the super output. For illustrative purposes, FIG. 4 shows 2×2 pixels per superpixel and illustrates a 2×2 set of superpixels. In turn 2×2=4 weight matrices are drawn. The number of pixels per superpixel and set of superpixels may vary, e.g., based on system architecture amongst other factors. For example in some cases there may be 4×4 pixels per superpixel, and a large image size of 100×100 superpixels (so 400×400 original input pixels). In this case there still may be 2×2=4 weight matrices, as long as ceiling ((pixels_per_superpixel+kernel_size−1)/pixels_per_superpixel) is less than or equal to 2 in each dimension.

As described above, the modified weight matrices are kernel elements. In this regard the modification process may be viewed as having reduced the number of kernel elements in the patch by changing a 3 by 3 convolution over inputs into a 2 by 2 convolution over super inputs where each kernel element is a larger two dimensional matrix, e.g., 4 times larger in both the rows and the columns (corresponding to input depth Z and output depth W). Each column of the stacked modified weight matrices 416-422 contains one copy of each of the elements of the 3 by 3 kernel 402. In some implementations the modified weight matrices may exhibit a banded structure, as shown for example by the diagonally similarly labeled kernel elements, e.g., diagonal 426.

Figure 5:
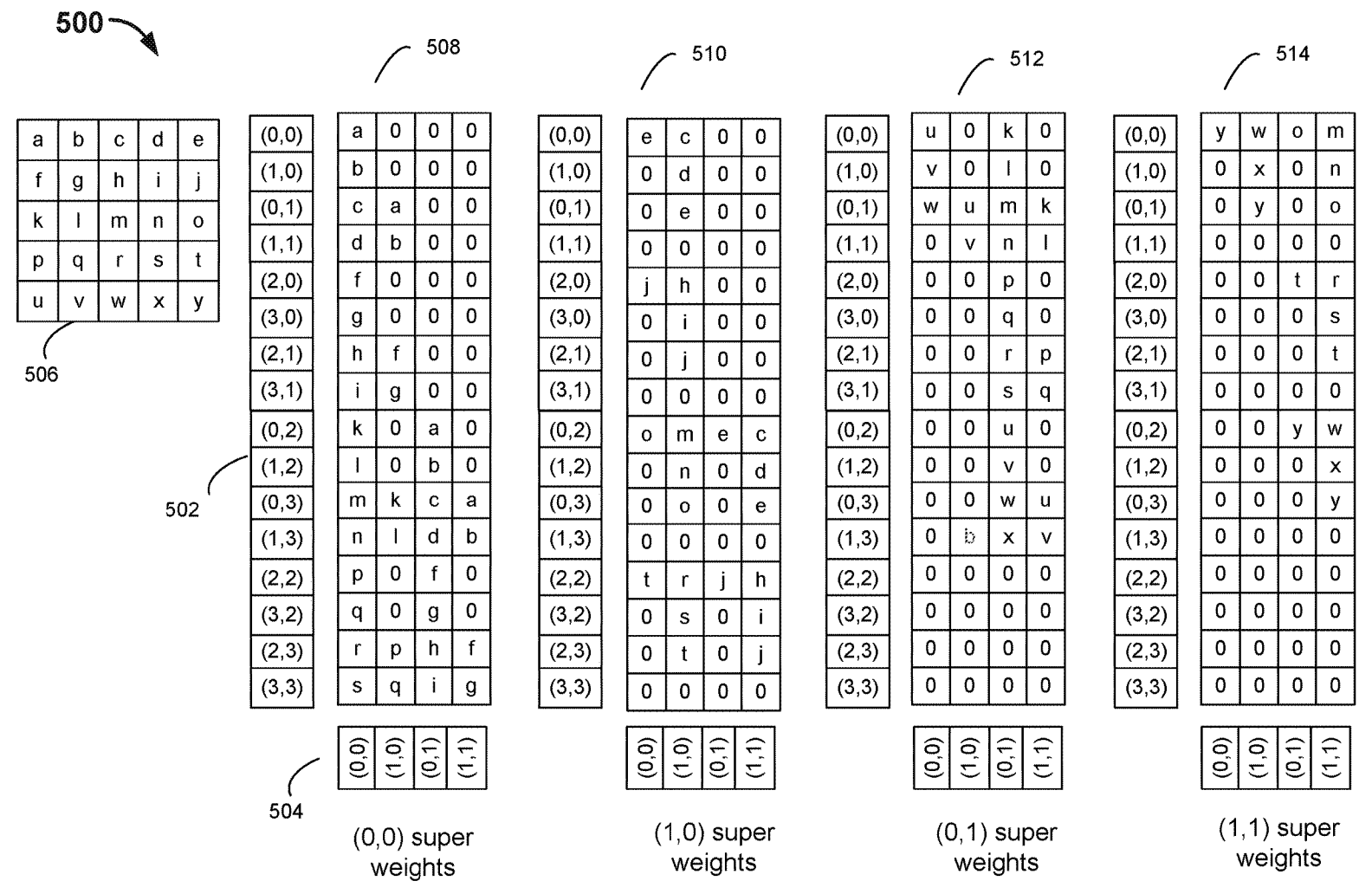

FIG. 5 is an example illustration 500 of convolutional neural network layer weight matrix modification that includes superpixel kernel striding. For example, the example illustration shows an efficient implementations of kernel striding as described above with reference to step 206 of FIG. 2. The illustrated implementation may be performed by a system of one or more computers located in one or more locations. For example, a superpixel convolutional neural network layer, e.g., the superpixel convolutional neural network layer 110 of FIG. 1A, appropriately programmed in accordance with this specification, can perform the illustrated implementation.

The example illustration 500 shows a weight diagram with a 5 by 5 kernel patch 506 whose elements are two dimensional weight matrices with dimension equal to the original input depth by original output depth, e.g., Z by W, 4 by 4 super inputs 502, each including 4 by 4 original inputs, and 2 by 2 super outputs 504, each including 2 by 2 original outputs. The example kernel stride is 2 by 2. The example illustration 500 includes four superpixel kernel elements 508-514. Each superpixel kernel element is a 16Z by 4W matrix. The inputs/super inputs versus the outputs/super outputs have been changed due to the 2 by 2 kernel stride, therefore there are only 4 outputs for each 16 inputs.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., as a result of the user interaction, can be received from the user device at the server.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer implemented method for training a convolutional neural network that includes a plurality of convolutional neural network layers on training data,
   wherein the convolutional neural network comprises (i) at least one superpixel convolutional neural network layer having respective superpixel convolutional neural network layer parameters that is configured to receive an X by Y by Z input tensor and process the received input tensor using one or more convolutional neural network layer weight matrices to generate an U by V by W output tensor, and (ii) one or more other convolutional neural network layers having respective layer parameters,
   wherein the method comprises:
      obtaining training data; and
      training the convolutional neural network on the training data to adjust the values of the parameters of the superpixel convolutional neural network and the values of the parameters of the other convolutional neural network layers to trained values, and
   wherein receiving, by the superpixel convolutional neural network layer, an X by Y by Z input tensor and processing the received input tensor using one or more convolutional neural network layer weight matrices to generate an U by V by W output tensor comprises:

transforming the X by Y by Z input tensor into a X' by Y' by Z' input tensor, wherein X' is smaller than or equal to X, Y' is smaller than or equal to Y, and Z' is larger than or equal to Z;

obtaining one or more modified convolutional neural network layer weight matrices, wherein (i) the modified weight matrices operate on the X' by Y' by Z' input tensor to generate a U' by V' by W' output tensor, and (ii) the U' by V' by W' output tensor comprises a transformed U by V by W output tensor, wherein U' is smaller than or equal to U, V' is smaller than or equal to V, and W' is larger than or equal to W; and processing the X' by Y' by Z' input tensor using the modified weight matrices to generate the U' by V' by W' output tensor, wherein the U' by V' by W' output tensor comprises the U by V by W output tensor.

2. The method of claim 1, wherein X' is equal to a ceiling of X divided by a natural number N, Y' is equal to a ceiling of Y divided by a natural number M, and Z' is equal to Z multiplied by NM, wherein the ceiling corresponds to a smallest integer larger or equal to.

3. The method of claim 2, wherein the one or more modified weight matrices comprise NM copies of each original weight corresponding to the entries of the modified weight matrices.

4. The method of claim 3, wherein training the convolutional neural network on the training data comprises performing a gradient descent and backpropagation neural network training process.

5. The method of claim 4, wherein performing the backpropagation training process comprises adding weight gradients across all NM copies to determine a net change in value for each original weight.

6. The method of claim 2, wherein the X by Y by Z input tensor represents XY first inputs and the X' by Y' by Z' input tensor represents X'Y' super inputs with each super input comprising a plurality of first inputs.

7. The method of claim 6, wherein the number of the plurality of first inputs equals NM inputs.

8. The method of claim 2, wherein the operation of the modified weight matrices on the X' by Y' by Z' input tensor is equivalent to the operation of the superpixel convolutional neural network layer weight matrices on the X by Y by Z input tensor.

9. The method of claim 2, wherein entries of the modified weight matrices comprise one or more convolutional neural network layer weight matrices.

10. The method of claim 2, wherein the modified weight matrices comprise matrices with a banded structure.

11. The method of claim 2, wherein U' is equal to a ceiling of U divided by a natural number P, V' is equal to a ceiling of V divided by a natural number Q, and W' is equal to W multiplied by PQ.

12. The method of claim 11, wherein the convolutional neural network layer includes a stride S in the X dimension and stride T in the Y dimension, and wherein the relationship between stride S, T, output tensor U by V by W and transformed output tensor U' by V' by W' is given by U'=ceiling(U/NS) and V'=ceiling(V/MT).

13. The method of claim 12, wherein the U by V by W output tensor represents UV first outputs and the U' by V' by W' output tensor represents U'V' super outputs with each super output comprising a plurality of first outputs.

14. The method of claim 13, wherein the plurality of first outputs equals PQ outputs.

15. The method of claim 1, wherein the superpixel convolutional neural network layer comprises a pooling sub layer.

16. The method of claim 2, wherein the U by V by W output tensor represents UV first outputs and the U' by V' by W' output tensor represents U' V' super outputs with each super output comprising a plurality of first outputs, and wherein the number of first outputs in the plurality of first outputs is dependent on the dimensions of the superpixel convolutional neural network layer weight matrices.

17. The method of claim 2, wherein the U by V by W output tensor represents UV first outputs and the U' by V' by W' output tensor represents U' V' super outputs with each super output comprising a plurality of first outputs, and wherein the number of outputs in the plurality of first outputs is dependent on one or more of (i) the architecture of the superpixel convolutional neural network layer, (ii) an architecture of the convolutional neural network including the superpixel convolutional neural network layer, or (iii) a device implementing the superpixel convolutional neural network layer.

18. A system comprising one or more computers and one or more storage devices storing instructions that are operable, when executed by the one or more computers, to cause the one or more computers to perform operations for training a convolutional neural network that includes a plurality of convolutional neural network layers on training data, wherein the convolutional neural network comprises (i) at least one superpixel convolutional neural network layer having respective superpixel convolutional neural network layer parameters that is configured to receive an X by Y by Z input tensor and process the received input tensor using one or more convolutional neural network layer weight matrices to generate an U by V by W output tensor, and (ii) one or more other convolutional neural network layers having respective layer parameters, the operations comprising:

obtaining training data; and training the convolutional neural network on the training data to adjust the values of the parameters of the superpixel convolutional neural network and the values of the parameters of the other convolutional neural network layers to trained values, and wherein receiving, by the superpixel convolutional neural network layer, an X by Y by Z input tensor and processing the received input tensor using one or more convolutional neural network layer weight matrices to generate an U by V by W output tensor comprises:

transforming the X by Y by Z input tensor into a X' by Y' by Z' input tensor, wherein X' is smaller than or equal to X, Y' is smaller than or equal to Y, and Z' is larger than or equal to Z;

obtaining one or more modified convolutional neural network layer weight matrices, wherein (i) the modified weight matrices operate on the X' by Y' by Z' input tensor to generate a U' by V' by W' output tensor, and (ii) the U' by V' by W' output tensor comprises a transformed U by V by W output tensor, wherein U' is smaller than or equal to U, V' is smaller than or equal to V, and W' is larger than or equal to W; and processing the X' by Y' by Z' input tensor using the modified weight matrices to generate the U' by V' by W' output tensor, wherein the U' by V' by W' output tensor comprises the U by V by W output tensor.

19. A computer storage medium encoded with instructions that, when executed by one or more computers, cause the one or more computers to perform operations for training a convolutional neural network that includes a plurality of convolutional neural network layers on training data,
wherein the convolutional neural network comprises (i) at least one superpixel convolutional neural network layer having respective superpixel convolutional neural network layer parameters that is configured to receive an X by Y by Z input tensor and process the received input tensor using one or more convolutional neural network layer weight matrices to generate an U by V by W output tensor, and (ii) one or more other convolutional neural network layers having respective layer parameters, the operations comprising:
obtaining training data; and
training the convolutional neural network on the training data to adjust the values of the parameters of the superpixel convolutional neural network and the values of the parameters of the other convolutional neural network layers to trained values, and
wherein receiving, by the superpixel convolutional neural network layer, an X by Y by Z input tensor and processing the received input tensor using one or more convolutional neural network layer weight matrices to generate an U by V by W output tensor comprises:
transforming the X by Y by Z input tensor into a X' by Y' by Z' input tensor, wherein X' is smaller than or equal to X, Y' is smaller than or equal to Y, and Z' is larger than or equal to Z;
obtaining one or more modified convolutional neural network layer weight matrices, wherein (i) the modified weight matrices operate on the X' by Y' by Z' input tensor to generate a U' by V' by W' output tensor, and (ii) the U' by V' by W' output tensor comprises a transformed U by V by W output tensor, wherein U' is smaller than or equal to U, V' is smaller than or equal to V, and W' is larger than or equal to W; and
processing the X' by Y' by Z' input tensor using the modified weight matrices to generate the U' by V' by W' output tensor, wherein the U' by V' by W' output tensor comprises the U by V by W output tensor.

20. The system of claim 18, wherein X' is equal to a ceiling of X divided by a natural number N, Y' is equal to a ceiling of Y divided by a natural number M, and Z' is equal to Z multiplied by NM, wherein the ceiling corresponds to a smallest integer larger or equal to.

21. The system of claim 20, wherein the one or more modified weight matrices comprise NM copies of each original weight corresponding to the entries of the modified weight matrices.

22. The system of claim 21, wherein training the convolutional neural network on the training data comprises performing a gradient descent and backpropagation neural network training process.

23. The system of claim 22, wherein performing the backpropagation training process comprises adding weight gradients across all NM copies to determine a net change in value for each original weight.

* * * * *